3,252,825
PROCESS OF COATING GLASS FIBERS WITH HYDROLYZED CONDENSATION PRODUCT OF AMINO SILANE AND COPOLYMERIZABLE MONOMER
Alfred Marzocchi, Cumberland, and Nicholas S. Janetos, Providence, R.I., assignors to Owens-Corning Fiberglas Corporation, a corporation of Delaware
No Drawing. Filed Sept. 14, 1959, Ser. No. 839,578
5 Claims. (Cl. 117—126)

This invention relates to novel condensation products and is more specifically directed to organic polymeric materials which are employed in combination with glass fibers in the manufacture of fiber reinforced plastics and laminates, coated fabrics and the like.

For purposes of description reference will be made to the treatment and use of glass fibers but it will be understood that the concepts of this invention will be applicable to other types of siliceous fibers having the characteristics of glass fibers from the standpoint of strength and inertness and from the standpoint of the physical and chemical characteristics of the fibers which raise the problems of anchorage to resinous systems.

A great number of uses have been developed for glass fibers. One of the most important of the applications, based upon the exceptionally high strength characteristics of the glass fibers, has been as a reinforcment or strengthening agent for synthetic resinous polymers or elastomers in the manufacture of plastics, laminates, coated fabrics and the like. It has been found that, unless a strong bonding relationship can be established and retained between the glass fiber surfaces and the afterapplied organic polymeric material, the contribution of strength by the glass fibers is considerably less than would otherwise be expected. Thus a considerable amount of research and development has been expended in maximizing the bonding relationships between the glass fiber surfaces and the organic resinous and/or polymeric materials.

In this respect, synthetically formed siliceous fibers, such as glass, are substantially unlike natural fibers in that the latter offer the possibilities of either a strong physical bond or a strong chemical bond or both with resinous materials whereas it is difficult to establish a strong physical or chemical bond with glass fibers as they are formed. For example, most natural fibers and even some of the siliceous fibers, such as asbestos, are characterized by a surface roughness or high porosity which is sufficient to enable resinous materials to acquire a strong physical bond with the fibers. On the other hand, glass fibers are non-porous and have perfectly smooth surfaces such that physical bonding with resinous materials is unattainable without additional pretreatment. Additionally, most natural or synthetic resinous fibers contain groupings on the surfaces which are more highly receptive to resinous materials, such that an anchorage can be established between the resinous materials and the organic or natural fiber surfaces. On the other hand, the groupings that predominate on the glass fiber surfaces are hydrophilic in character such that only a weak bond can be established in the first instance between the synthetic resinous or polymeric materials and the glass fiber surfaces. Such bonding as is capable of being initially established is substantially reduced by water films which preferentially form between the resinous material and the glass fiber surfaces in the presence of moisture or high humidity. Thus fuller utilization of the strength and other desirable properties of the glass fibers in combination with organic polymeric or resinous materials has depended to a considerable extent on increasing the bonding relationship between the glass fiber surfaces and the organic polymeric materials and retaining the desired bonding relationship under moist or high humidity conditions.

Over the past several years, research and development has produced a number of systems which are capable of use for rendering the glass fiber surfaces more receptive to resinous and/or organic polymeric materials and for enhancing the bonding relationship between the glass fiber surfaces and such resinous or polymeric materials. For the most part, such systems have been based on the operation of anchoring agents having at least one group capable of strong and relatively permanent attachment to the surfaces of the glass fibers and one or more additional groups capable of attachment to the resinous or polymeric materials whereby the anchoring agents are able to tie the resinous or polymeric materials onto the glass fiber surfaces.

U.S. Patent 2,552,910 illustrates one of the systems wherein use is made of an anchoring agent in the form of a chromic (Werner) complex compound having a carboxylato group coordinated with the trivalent nuclear chromium atom in which the carboxylato group is of less than 6 carbon atoms and contains a highly functional group. The chromic atom of the complex is believed capable of strong attachment to the glass fiber surfaces while the functional groups of the short chained carboxylato radical is capable of effecting strong attachment with resinous or polymeric materials. U.S. Patent 2,563,288 illustrates another system wherein use was made of an anchoring agent in the form a silane, its hydrolysis products or its polymerization products having at least one of the organic groups attached to the silicon atom containing less than 7 carbon atoms and formed with ethylenic unsaturation. The theory of operation is believed to reside in the ability of the silicon atom to become strongly attached to the silicon oxide groupings present on the surfaces of the glass fibers while the ethylenic group provides means for attachment of resinous or polymeric materials preferably formed by addition polymerization through ethylenic or acetylenic groups in the monomer of which the polymer is formed.

The effectiveness of an anchoring agent depends greatly upon the availability of the glass fiber surfaces for attachment. Thus where a size has been previously applied to the glass fiber surfaces in forming to enable the fibers to be processed into strands, yarns and fabrics without destruction of the fibers by mutual abrasion, it has been necessary to remove the size from the glass fiber surfaces before application of the anchoring agent. Difficulties arise in the application of the anchoring agent directly to the glass fibers in forming because the anchoring agent is, in itself, substantially incapable of the lubricity and bonding required for processing the fibers into strands or fabrics. The anchoring agent is further incapable of proper protection of the glass fiber surfaces to prevent destruction by mutual abrasion. Thus, in commercial practice, a rather elaborate, time-consuming and expensive operation is employed wherein the glass fibers are sized in forming, the sized glass fibers are processed into strands and woven into fabrics, the fabrics are washed or heat treated to remove the size and then the cleaned glass fibers are coated with the anchoring agent. Such multiple operations not only make the process expensive and time-consuming but it has been found that the glass fibers are damaged to some extent during handling, while in an unprotected state, after the size has been removed.

Numerous attempts have been made to adopt a system wherein the anchoring agent can be incorporated as a component in the size composition thereby producing a size which has the desired processing characteristics for fabrication of fibers into yarns and fabrics and the desired performance characteristics which will render the sized fibers more receptive to resinous and organic polymeric materials without necessitating the removal of size originally applied. While such combinations provide improvement by comparison with size compositions without anchoring agents, full benefit of the anchoring agent is incapable of being achieved because of the dilution of the anchoring agent in the size composition such that only a small proportion of that present in the applied coating is effective for the intended purpose, with resultant haphazard bonding between resin and fiber.

It is, therefore, a primary object of this invention to provide a novel condensation product which provides film-forming characteristics for the protection of the glass fiber surfaces and which also contains radicals or groups which are capable of strong and preferential attachment to the glass fiber surfaces as well as being effective in enabling adhesion to after applied organic polymeric or resinous materials while being compatible therewith.

It is another object of this invention to provide a condensation product which functions simultaneously as a protective agent and as an anchoring agent to provide attachment to the siliceous fiber surfaces without dilution while at the same time, the material is capable of the function of a protective coating or size and a receptive base for resinous materials subsequently to be applied in the fabrication of siliceous fiber reinforced plastics, laminates, coated fabrics and the like.

It is still another object of this invention to produce and to provide a method for producing glass fibers having a treatment on the surface in the form of a coating which is capable of the combination of functions of protecting the glass fiber surfaces and bonding the fibers in strand or yarn formation while at the same time rendering the fibers highly receptive to organic polymeric or resinous materials which are employed in combination with the glass fibers in the manufacture of plastics, laminates, coated fabrics and like structures.

These and other objects will become more evident as the description proceeds.

Broadly speaking, the compositions of this invention are condensation products of certain functional organo-silanes, hereinafter defined, and compounds having functional groups which are copolymerizable therewith. By functional silane is meant a silane of the general formula $(R_2NR'(HNR'')_m)_nSiX_{4-n}$ where R is hydrogen or an alkyl radical having one to four carbon atoms, R' and R'' are divalent hydrocarbon radicals having one to four carbon atoms, $m$ is 0 or 1, $n$ is 1 or 2 and X is a readily hydrolyzable radical. Compounds which are copolymerizable with said silane include organic resinous and resin forming materials having at least one functional group which is reactive with the silane and which, preferably is a group selected from the class consisting of epoxide, carboxyl, aldehyde, an olefinic double bond, and anhydride.

The functional silanes are capable of condensing with the copolymerizable compounds through the functional group or groups and the silicon atom, forming a part of the condensation product thus formed, is then capable of anchoring the polymeric compound at spaced apart points to the glass surface while the resinous or resin forming part of the condensation product in turn forms a receptive base for after applied resinous material. The film forming properties of the condensation products provide the characteristics of a size and finish to bond the plurality of glass filaments in the strand or yarn and protect the glass fiber surfaces against destruction by mutual abrasion. Because of the film forming properties, the condensation products of this invention may be utilized in the absence of any other resinous material in forming a finish on the glass fiber surfaces.

Specific examples of silanes which are operative in this invention are delta (N-amino ethyl) amino butyl triethoxy silane, delta N-methyl ethyl (N-amino ethyl) amine amino butyl trichlorosilane, bis gamma N-propyl diethylamino amino propyl dimethoxy silane, bis beta (N-aminoethyl) (N-amino ethyl) diethoxy silane, beta N-ethylamine amino ethyl tribromosilane, gamma propyl (N-amino ethyl) amino trimethoxy silane, and beta N-ethylamine ethyl tri beta methoxy ethoxy silane. The readily hydrolyzable groups include halogen, acido groups of less than four carbons, ethoxy, methoxy, beta methoxy ethoxy and beta ethoxy ethoxy.

Representative polymer or polymeric forming materials which may be reacted with the silanes in the preparation of the condensation products of this invention are epoxides, diepoxides, polymeric materials having available carboxyl groups such as polyacrylic acid, aldehydes such as formaldehyde which in turn may be condensed with alcohols such as polyvinyl alcohol, unsaturated polyesters prepared by the condensation of polybasic acids or anhydrides and polyhydric alcohols, such as the condensation product of maleic anhydride and ethylene glycol, other ethylenically unsaturated compositions such as the unsaturated derivatives of polyacrylate polystyrenes and polyvinyl acetates, and anhydrides such as succinic anhydride and polyvinyl methyl ether maleic anhydride.

On the other hand, the organo-silicon group forming a part of the polymer provides a silicon atom having hydrolyzable groups which, on hydrolysis strongly and permanently tie in the polymer as a protective coating onto the glass fiber surfaces while the polymeric group reacted with the organo-silicon atom is capable of being specifically designed so to be compatible with the after applied resin desired in the laminate and preferably is reactive with the resin itself. Alternatively, where the condensation products of this invention are used to form a finish, their film forming properties make it unnecessary for the incorporation of additional resinous materials in the finishing bath or for the application of additional resin to glass fabrics after passing the fabrics through the finishing baths.

When utilized as a finish, the condensation products of this invention may be tailored so that they contain a plurality of reactive groups, such as hydroxyl or carboxyl, in the polymeric chains which in turn will react with reactive groups in after applied dyestuffs such as basic and acid type dyes, thus providing chemical bonding with the after applied dyes. When used as a sizing material glass fiber lubricants are added to the condensation products of this invention. The necessity of complicated formulations containing a coupling agent, a film former, and a lubricant is thus eliminated. The condensation products of this invention provide for more efficient coupling to the glass fiber surfaces.

It will thus be readily apparent that the silane modified polymeric complexes formed in accordance with this invention will be effective to tie in both with other resins or polymers and reactive dye compounds on the one hand and with the glass fiber surfaces on the other hand. In addition the monomeric or polymeric material which is initially reacted with the silane is capable of infinite modifications depending upon the compatible systems desired.

It will be further understood that the concepts described are applicable not only to tie in resinous systems to glass or the other siliceous fibers, but that also the concepts described herein are equally applicable in the combination of resinous material and glass platelets or flexible plates of thin cross section. Such platelets or plates are also characterized by high strength and flexibility and can be used in combination with resinous materials in molded and laminated structures.

To the present, presentation has been made of the theoretical concepts of the reaction to incorporate a silane as a part of the film-forming resinous polymer which can be used to provide the combined functions of a size for bonding and protecting the fibers while being processed into strands, yarns and fabrics and, with the removal or replacement of a previously applied size composition, of an anchoring agent which becomes preferentially attached to the glass fiber surfaces and which functions as a base for the attachment of resinous materials to strongly tie in the resins to the glass fiber surfaces. Description will now be made of the preparation of condensation products representative of the foregoing concepts, all parts being by weight.

*Example 1*

Procedure.—500 grams of gamma amino propyl triethoxy silane and 500 grams of toluene were charged into a reflux flask and the solution was heated to reflux temperature. 200 grams of a diepoxide of the following composition:

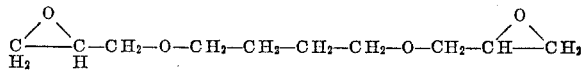

was added dropwise over a period of about one half hour. This solution was then refluxed for an additional half hour and transferred to a distillation column where the toluene was distilled off at reduced pressure (10 mm.). 3 grams of the resultant condensation product was then dispersed in 97 grams of water and hydrolyzed at a pH of 3.5. The resultant emulsion had a solids content of 3% by weight and could be used directly as a finish. When used as a finish, the emulsion was padded onto a glass fabric and dried and cured at 300° F. The resultant fabric had a high resistance to abrasion plus good hand and soft drape as well as exhibiting excellent wash fastness and water repellency. When used as a plastic reinforcement, such fabric exhibited excellent compatibility with epoxy resins, being rapidly wet out and forming a firm bond with the after applied resinous material used in forming the laminate.

In order to form a size composition 3 grams of the reaction product, after the toluene has been distilled off at the reduced temperature, was mixed with 97 grams of water to form an emulsion having a solids content of 3% by weight. The resultant emulsified product was hydrolyzed at a pH of 3.5, hydrochloric acid being added to adjust the pH. 0.2% of a suitable glass fiber lubricant, in this case, the tetra-ethylene pentamine-pelargonic acid condensate made soluble with acetic acid, was added to the aqueous emulsion and the resultant emulsion was then applied to glass filaments in forming using a standard pad applicator and the sized filaments were then processed into a roving product having good handlebility and abrasion resistance. This roving was then utilized to form chopped roving which was from an epoxy resin-fiber reinforced laminate was prepared. The laminate evidenced both excellent wet out and bonding between the sized fibers and the laminating resin.

*Example 2*

Procedure.—500 cc. of water was weighed into a one liter beaker and 27.9 grams of delta (N-aminoethyl) amino butyl triethoxy silane was added thereto with stirring. The pH of this solution was adjusted to 3.5 with hydrochloric acid after which 14 grams of a low molecular weight polyacrylic acid solution (50% by weight of solids) was added with agitation.

The resultant solution was then padded directly onto a glass fabric which had been heat cleaned and the treated glass fabric was dried in air and cured at 300° F. Washing in soap solutions did not affect the fabric.

In order to form a size 0.2% by weight of the tetraethylene pentamine-stearic acid condensate made soluble with acetic acid, was added to an emulsion containing three parts by weight of the condensation product in 97 parts by weight of water.

*Example 3*

500 grams of water was charged into a one liter beaker to which 17 grams of gamma amino propyl trimethoxy silane was added. The pH was adjusted to 3.0 with sulfuric acid and 4.3 grams of 99% hydrolyzed polyvinyl alcohol was added with agitation. Nine grams of a 30% formalin solution was then added and the mixture was heated to 150° F. with stirring for 30 minutes after which the emulsion was cooled to room temperature. As a finish, the emulsion was applied directly to heat cleaned glass fabric, 1% by weight of Sapamine WL being added for improved hand. Sapamine WL is a quaternary amine compound in which one of the amine groups of ethylene diamine is reacted with a fatty acid to form a fatty amide while the other amine group is made tertiary by reaction with an alkyl compound. To provide color, pigment could be added to the finish bath or padded onto the finished fabric prior to cure.

To give a finish reactive with cotton substantive dyestuff, the amount of hydrolyzed polyvinyl alcohol added to the silane in Example 3 was increased to 17 grams resulting in a condensation product having a plurality of reactive hydroxyl groups.

*Example 4*

To prepare a compatible polyester and epoxy forming size, 450 grams of a polyester (prepared by reacting equimolecular quantities of maleic anhydride and phthalic anhydride with two moles of diethylene glycol) was dissolved in 500 cc. of diethyl ether, charged into a reaction flask and gently refluxed. After refluxing for one half hour, the diethyl ether was distilled off at about 70° C. and 200 grams of alpha amino propyl triethoxy silane was added drop wise with stirring. The reaction product was cooled to room temperature and diluted with 100 grams of glacial acetic acid.

Fifteen grams of this solution along with 2 grams of iso-octyl phenyl ether of polyethylene glycol and 12.5 grams of polyvinyl alcohol was added to 500 grams of water with stirring to form a stable aqueous forming size.

*Example 5*

22.2 grams of gamma amino propyl triethoxy silane was dissolved in 200 cc. of chloroform and 10 grams of succinic anhydride was dissolved in 100 cc. of chloroform. The succinic anhydride solution was then added slowly to the solution of the silane in chloroform with stirring and the mixture was refluxed for about one half hour. The chloroform was then distilled at about 65° C.

Three parts by weight of the condensation product was added to 97 parts by weight of water and the resultant solution was hydrolyzed at a pH of about 9.5, ammonium hydroxide being added to adjust the pH, to form a glass fiber size and finish composition.

It will be apparent from the foregoing that we have provided the basis of a new reaction for producing a new and improved composition which may be used as an anchoring agent in the treatment of glass fibers to provided the simultaneous function of a size for the protection of the glass fibers and an anchoring agent for improving the bonding relationship between the glass fibers and other resinous materials. It will be understood that the described reaction may be carried out with varied polymeric or polymerizable materials, as previously pointed out, for beneficial use in the treatment of glass fibers to be combined with other resinous materials, preferably of the type corresponding with the polymerizable or polymeric materials with which the silane has been condensed.

It will be further understood that the described anchoring agents may be incorporated with a lubricant in a size composition for use in the treatment of fibers and that the medium of application and concentration of the anchoring agent in the treating composition may be varied in accordance with the specific requirements. Where a lubricant is used, it is present to the extent of about 0.1 to 0.5 percent by weight of the size composition. As the glass fiber lubricant use can be made of a fatty acid amides and amine compounds, as presented by tetraethylene pentamine-pelargonic acid condensate made soluble with acetic acid, tetraethylene pentamine-fatty acid condensate reacted to contain 5-allyl methallyl side chains as a direct substitution on the nitrogen groups, tetraethylene pentamine-stearic acid condensate made soluble with acetic acid and the fatty acid amides and amines, such as the diamine, formed of coconut oil, fatty acids and the like.

It is also to be understood that the condensation products of this invention may be applied as a finish to heat cleaned glass fabrics and cured without further after treatments being necessary. Dies and pigments which may or may not be reactive with the condensation products, may be added to the finish composition or padded onto the treated fabric prior to curing.

It will be further understood that changes may be made from the standpoint of formulation, preparation of the size and/or finish compositions, method of application and use without departing from the spirit of the invention, especially as defined in the following claims.

We claim:

1. A method for rendering glass fibers compatible with and adherent to organic polymeric resinous materials comprising coating the surfaces of said fibers prior to combination with said organic polymeric resinous materials, with the hydrolyzed condensation product of a silane coupling agent having the general formula $(R_2NR'(HNR'')_m)_nSiX_{4-n}$ where R is selected from the group consisting of hydrogen and an alkyl radical of less than 5 carbon atoms, R' and R'' are divalent hydrocarbon radicals of less than 5 carbon atoms, X is a readily hydrolyzable radical selected from the class consisting of halogen, methoxy, ethoxy, beta methoxy ethoxy and beta ethoxy ethoxy, m is an integer having a value of from 0 to 1, and n is an integer having a value of from 1 to 2, and a copolymerizable monomeric material selected from the group consisting of polyacrylic acid, aldehyde, unsaturated polyester and dicarboxylic acid anhydride.

2. A method for rendering glass fibers compatible with and adherent to organic polymeric resinous materials coating the surfaces of said fibers prior to combination with said organic polymeric resinous materials, with the hydrolyzed condensation product of formaldehyde and a silane coupling agent having the general formula $(R_2NR'(HNR'')_m)_nSiX_{4-n}$ where R is selected from the group consisting of hydrogen and an alkyl radical of less than 5 carbon atoms, R' and R'' are divalent hydrocarbon radicals of less than 5 carbon atoms, X is a readily hydrolyzable radical selected from the class consisting of halogen, methoxy, ethoxy, beta methoxy ethoxy and beta ethoxy ethoxy, m is an integer having a value of from 0 to 1, and n is an integer having a value of from 1 to 2.

3. A method for rendering glass fibers compatible with and adherent to organic polymeric resinous materials comprising coating the surfaces of said fibers prior to combination with said organic polymeric resinous materials, with the hydrolyzed condensation product of polyacrylic acid and a silane coupling agent having the general formula $(R_2NR'(HNR'')_m)_nSiX_{4-n}$ where R is selected from the group consisting of hydrogen and an alkyl radical of less than 5 carbon atoms, R' and R'' are divalent hydrocarbon radicals of less than 5 carbon atoms, X is a readily hydrolyzable radical selected from the class consisting of halogen, methoxy, ethoxy, beta methoxy ethoxy and beta ethoxy ethoxy, m is an integer having a value of from 0 to 1, and n is an integer having a value of from 1 to 2.

4. A method for rendering glass fibers compatible with and adherent to organic polymeric resinous materials comprising coating the surfaces of said fibers prior to combination with said organic polymeric resinous materials, with the hydrolyzed condensation product of the reaction product of diethylene glycol and a mixture of maleic anhydride and phthalic anhydride and a silane coupling agent having the general formula $$(R_2NR'(HNR'')_m)_nSiX_{4-n}$$

where R is selected from the group consisting of hydrogen and an alkyl radical of less than 5 carbon atoms, R' and R'' are divalent hydrocarbon radicals of less than 5 carbon atoms, X is a readily hydrolyzable radical selected from the class consisting of halogen, methoxy, ethoxy, beta methoxy ethoxy and beta ethoxy ethoxy, m is an integer having a value of from 0 to 1, and n is an integer having a value of from 1 to 2.

5. A method for rendering glass fibers compatible with and adherent to organic polymeric resinous materials comprising coating the surfaces of said fibers prior to combination with said organic polymeric resinous materials, with the hydrolyzed condensation product of succinic anhydride and a silane coupling agent having the general formula $(R_2NR'(HNR'')_m)_nSiX_{4-n}$ where R is selected from the group consisting of hydrogen and an alkyl radical of less than 5 carbon atoms, R' and R'' are divalent hydrocarbon radicals of less than 5 carbon atoms, X is a readily hydrolyzable radical selected from the class consisting of halogen, methoxy, ethoxy, beta methoxy ethoxy and beta ethoxy ethoxy, m is an integer having a value of from 0 to 1, and n is an integer having a value of from 1 to 2.

References Cited by the Examiner

UNITED STATES PATENTS

| | | | |
|---|---|---|---|
| 2,541,896 | 2/1951 | Vasileff et al. | 260—46.5 |
| 2,563,288 | 8/1951 | Steinman | 117—126 |
| 2,563,289 | 8/1951 | Steinman | 117—126 |
| 2,754,312 | 7/1956 | Elliot | 260—46.5 |
| 2,819,245 | 1/1958 | Shorr | 260—46.5 |
| 2,832,754 | 4/1958 | Jex et al. | 260—46.5 |
| 3,033,815 | 5/1962 | Pike et al. | 260—46.5 |
| 3,044,982 | 7/1962 | Jex et al. | 260—46.5 |

OTHER REFERENCES

Organo-Functional Silanes, Union Carbide and Carbon Corp., SF–1055, October 1956.

WILLIAM H. SHORT, *Primary Examiner.*

MILTON S. STERMAN, JOSEPH R. LIBERMAN,
*Examiners.*